United States Patent [19]
Fujikawa et al.

[11] Patent Number: 5,278,566
[45] Date of Patent: Jan. 11, 1994

[54] RADAR APPARATUS

[75] Inventors: Takumi Fujikawa, Takarazuka; Yoshiyuki Kiya, Nishinomiya; Nishinomiya Aridome, Kobe, all of Japan

[73] Assignee: Furuno Electric Company, Limited, Hyogo, Japan

[21] Appl. No.: 927,495

[22] PCT Filed: Feb. 1, 1992

[86] PCT No.: PCT/JP92/00099
 § 371 Date: Sep. 29, 1992
 § 102(e) Date: Sep. 29, 1992

[30] Foreign Application Priority Data

Feb. 1, 1991 [JP] Japan .................................. 12046

[51] Int. Cl.⁵ ............................. G01S 7/40; G01S 7/56
[52] U.S. Cl. ................................... 342/174; 342/176
[58] Field of Search ..................... 342/174, 176, 185

[56] References Cited

U.S. PATENT DOCUMENTS

5,138,325 8/1992 Koury ........................... 342/174 X
5,157,406 10/1992 Fujikawa et al. ............... 342/185

Primary Examiner—T. H. Tubbesing
Attorney, Agent, or Firm—Jordan & Hamburg

[57] ABSTRACT

A radar apparatus radiates search signals successively in different directions, receives echo signals and displays the signals so that surrounding conditions in a wide range of directions are displayed. The radar apparatus comprises a buffer memory for temporarily storing echo signals resulting from single search signals, a memory for storing echo signals supplied from the buffer memory and corresponding to single scans at corresponding memory elements, a timing adjusting amount setter for determining a timing adjusting amount in a distance direction, and a control arrangement for causing the buffer memory to write received echo signals thereinto based on the determined timing adjustment amount.

6 Claims, 12 Drawing Sheets

RADAR APPARATUS

FIELD OF THE INVENTION

The present invention relates to a radar apparatus which is provided with a function of adjusting time instants in a distance axis to receive and display echo signals, when a radar apparatus is installed or the like.

BACKGROUND OF THE INVENTION

Generally, a time adjustment for operations is made when a radar apparatus is newly installed on a ship or the like. This adjustment makes positions of radar images displayed on an indicator in a distance direction correspond with their actual distances with respect to the radar antenna.

Since, generally, a time duration from an instant at which a trigger pulse is supplied from a display unit to an antenna unit to another time instant at which a resultant echo rises consists of a time for a round trip of a radio signal to an object and an associated delay time, a timing adjustment is necessary. Causes of the delay time are signal delays due to cables between a display unit and an antenna unit, a delay in a transmission circuit and a delay in a receiving circuit, and the like.

Conventionally, in order to cope with the problem, a timing adjustment was made so that reception signal data can be sampled starting at a point corresponding to zero in distance from an antenna, when a radar is installed on a ship or the like.

Figure 6:
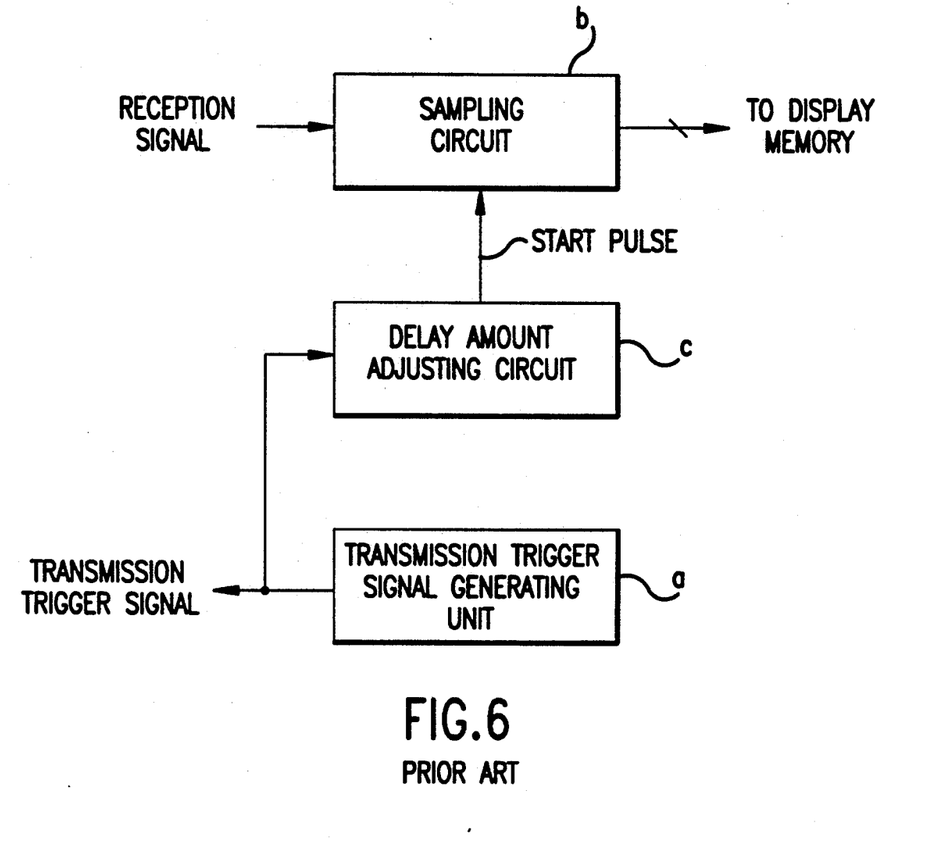
FIG. 6 is a bock diagram including a timing adjustment circuit in a conventional radar apparatus.

In order to do the timing adjustment, as shown in FIG. 6, a time delay amount adjusting circuit "c" is provided between a transmission trigger pulse generating unit "a" for generating a transmission trigger pulse and a sampling circuit "b" for digitizing reception signals at a predetermined sampling period, and the transmission trigger pulse is supplied to the sampling circuit "b" through the delay amount adjusting circuit "c" as a start pulse. When a timing adjustment is to be made, search radio signals are emitted to an experimental object placed at a distance from the antenna and the time delay amount given to the transmission trigger pulse is manually adjusted at the delay amount adjustment circuit "c" so that image distortions are not generated.

In conventional radar apparatuses, it has been required to make timing adjustments so that reception signals can be sampled starting at a point corresponding to zero distance from an antenna, when a radar apparatus is newly installed on a ship, or when a cable is replaced with another cable having another length or when circuit components in transmitting or receiving units are changed. Thus, adjustments have been cumbersome.

Conventionally, a mono-multivibrator IC has been used to initiate to sample reception signals after a time elapses from a time instant at which a trigger signal is generated. Thus, the delay time has been adjusted by varying CR time constant.

Figure 11:
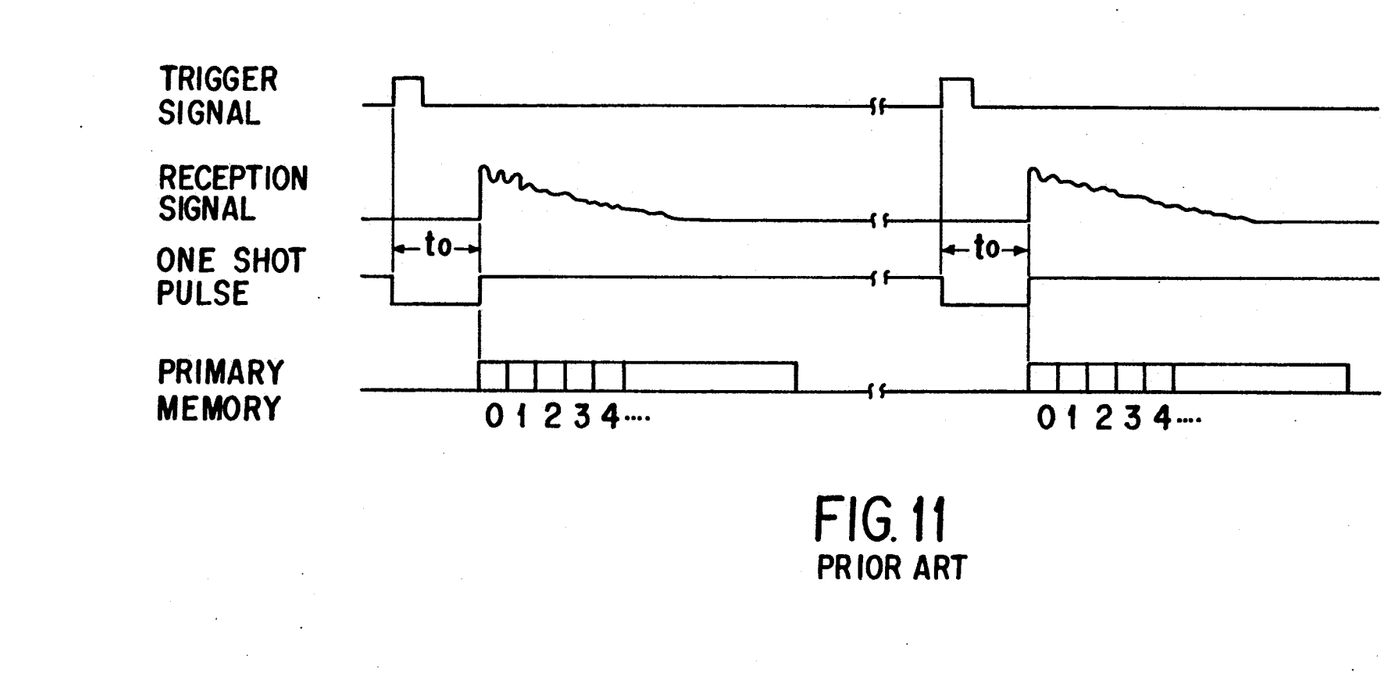
FIG. 11 is a timing chart representing signals produced by a conventional radar apparatus.
Figure 12:
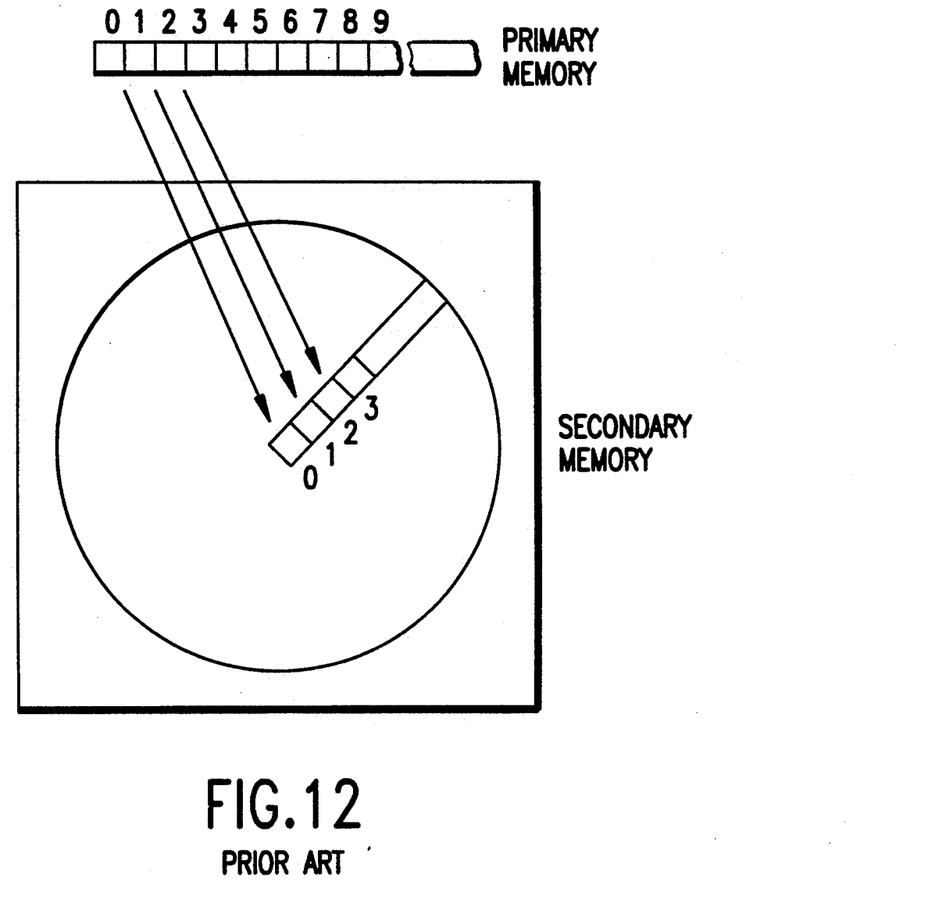
FIG. 12 is a diagram illustrating an example for transferring data in a conventional radar apparatus.

Some signals produced by a conventional radar apparatus are shown in a form of timing chart shown in FIG. 11. Referring to FIG. 11, reception signals appear after a time "$t_0$" elapses from an instant at which a trigger signal is generated. One shot pulse is produced lasting a time "$t_0$". A primary memory successively stores reception signals after the end edge of the one shot pulse. Reception signals stored in the primary memory are transferred to a secondary memory when sampling operations are not being made. There is shown in FIG. 12 an example for transferring data from the primary memory to the secondary memory. Write addresses of the secondary memory correspond to a pointing direction of the antenna, and, as shown in the figure, the first memory element of the primary memory corresponds to the center of the secondary memory, i.e., the position of the antenna. The data stored in the primary memory are successively transferred to corresponding memory elements of the secondary memory.

Such conventional apparatuses for controlling the start time to sample reception signals works effectively when a comparatively short one shot pulse is produced. But, when the CR time constant is to be made longer to lengthen the delay time, the period of one shot pulse will vary by a larger amount than the period of sampling pulses, and thus jitters are produced.

For example, with a surveillance radar used in a fish raising farm, there is sometimes used a long cable having a length of 1 km or 3 km. In such cases it is desired to produce a long-lasting and stable one shot pulse.

It is to be noted that in order to cope with the problem, digital circuits for counting clock signals to produce a desired delay signal may be used. In this case, however, an extremely high-speed operation is required. For example, with a range of 0.25 NM and a radius of 240 dots, the sampling frequency of clock pulses for each dot will be 77.7 MHz. It is difficult to construct a delay circuit operating at this speed with digital circuits at a low cost.

SUMMARY OF THE INVENTION

One object of the present invention is to provide a radar apparatus which is capable of automatically adjusting time instants to receive echo signals and display the signals, when a radar apparatus is installed on a ship or the like.

Another object of the present invention is to provide a radar apparatus having a buffer memory for temporarily storing echo signals resulting from a search pulse and having a memory provided with the same number of memory elements as the number of picture elements of an indicator and storing echo signals supplied from the buffer memory at corresponding memory elements thereof. The radar apparatus detects a main included in the received echo signals, and initiates the writing of echo signals into the buffer memory based on the main bang so that a timing to receive echo signals and display the signals is automatically adjusted.

Another object of the present invention is to provide a radar apparatus having a buffer memory for temporarily storing echo signals resulting from a search pulse and having a memory provided with the same number of memory elements as the number of picture elements of an indicator and storing echo signals supplied from the buffer memory at corresponding memory elements thereof. The radar apparatus detects a main bang included in the received echo signals, and initiates the writing of echo signals transmitted from the buffer memory into the memory based on the main bang detected so that time instants to receive echo signals and display the signals are automatically adjusted.

Another object of the present invention is to provide a radar apparatus having a primary memory for storing reception signal data corresponding to one sweep and a secondary memory storing reception signal data corresponding to one scan. The radar apparatus moves a read reference point corresponding to an antenna position in a primary memory by a time amount set so that a time instant to start receiving echo signals and displaying the signals is adjusted.

According to a first feature of the present invention, a radar apparatus for radiating search signals successively in different directions, receiving echo signals and displaying the signals on an indicator to display surrounding conditions in a wide range of directions comprises a receiving unit for receiving echo signals, a buffer memory for temporarily storing echo signals produced from the receiving unit and resulting from one search signal, a memory having memory elements with the number of the memory elements more than that of the picture elements of an indicator and storing echo signals supplied from the buffer memory at corresponding memory elements thereof, an indicator for displaying the signals read out from the memory, a main bang detecting means for detecting a main bang included in the received echo signals and a start signal generating means for generating a start signal for initiating to write echo signals into the buffer memory based on the main bang detected by the main bang detecting means.

According to a second feature of the present invention, a radar apparatus for radiating search signals successively in different directions, receiving echo signals and displaying the signals on an indicator to display surrounding conditions in a wide range of directions comprises a receiving unit for receiving echo signals, a buffer memory for temporarily storing echo signals produced from the receiving unit and resulting from one search signal, a memory having memory elements with the number of the memory elements more than that of the picture elements of an indicator and storing echo signals supplied from the buffer memory at corresponding memory elements thereof, a main bang detecting means for detecting a main bang included in the received echo signals and a start signal generating means for generating a start signal for initiating to write echo signals from the buffer memory into the memory based o the main bang detected by the main bang detecting means.

Since an antenna of a radar apparatus is used, generally, both for transmission and reception, there is provided between the transmitting and receiving unit and the antenna a circulator for alternately changing signal flows depending on a transmission operation and a reception operation. At the circulator, a portion of transmission radio wave energy leaks directly to the receiving circuit before the transmission radio energy is emitted from the antenna. Since this signal (so-called main bang) does not go out from the antenna, it is the signal corresponding to zero distance from the antenna.

Accordingly, if the main bang is detected and reception signals from the antenna are sampled with respect to the signal as a starting point, errors are not generated in relation to the time instant at which a sampling of reception signals is started.

Figure 1:
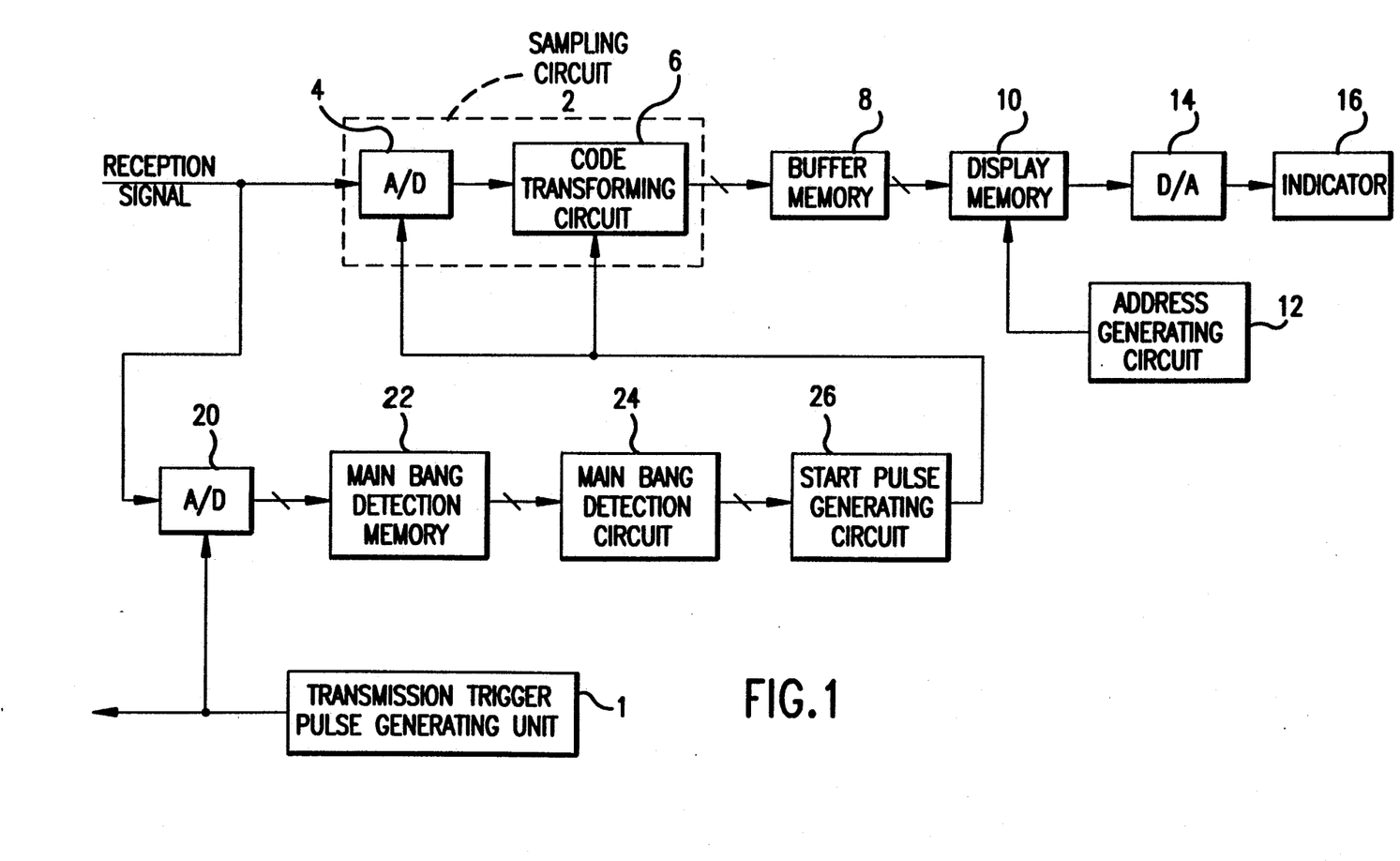
FIG. 1 is a block diagram of a principal portion of a radar apparatus according to the present invention.

The first and the second features of the present invention result from observations of these facts. In order to solve the foregoing problems, there is used a radar apparatus comprising a transmission trigger pulse generating unit 1 for determining a radiation time instant at which a search radio signal is emitted from an antenna, a sampling circuit 2 for converting reception signals to digital signals at a predetermined time period with the reception signals obtained by receiving echo signals resulting from the search radio signal and reflected by objects, a buffer memory 8 for temporarily storing reception signal data sampled by the sampling circuit 2 and corresponding to a plurality of beams, a display memory 10 for storing the reception signal data transferred from the buffer memory 8 as image data, an address signal generating circuit 12 for generating write/read address signals for writing the image data into and reading out the image data from the display memory 10, and an indicator 16 comprised of a cathode-ray tube or the like and displaying the image data read out from the display memory 10. The radar apparatus is constructed as will be described.

With the first feature of the present invention, the transmission trigger pulse generating unit 1 is constructed in a manner that the output periods of transmission trigger pulses are different from one another for each trigger pulse. The radar apparatus is also provided with an A/D converter for converting reception signals obtained by an antenna to digital signals at a predetermined sampling period in response to a transmission trigger pulse from the transmission trigger pulse generating unit 1, a main bang detection memory 22 for storing the reception signal data digitized by an A/D converter 20 and corresponding to a plurality of beams, a main bang detecting circuit 24 for detecting a main bang included in the reception signal data by performing a sweep correlation on the signals stored in the main bang detection memory 22 and corresponding to a plurality of beams and a start pulse generating unit 26 for generating a start pulse for initiating to start a sampling operation in the sampling circuit 2 in response to a main bang detected by the main bang detecting circuit 24.

Figure 4:
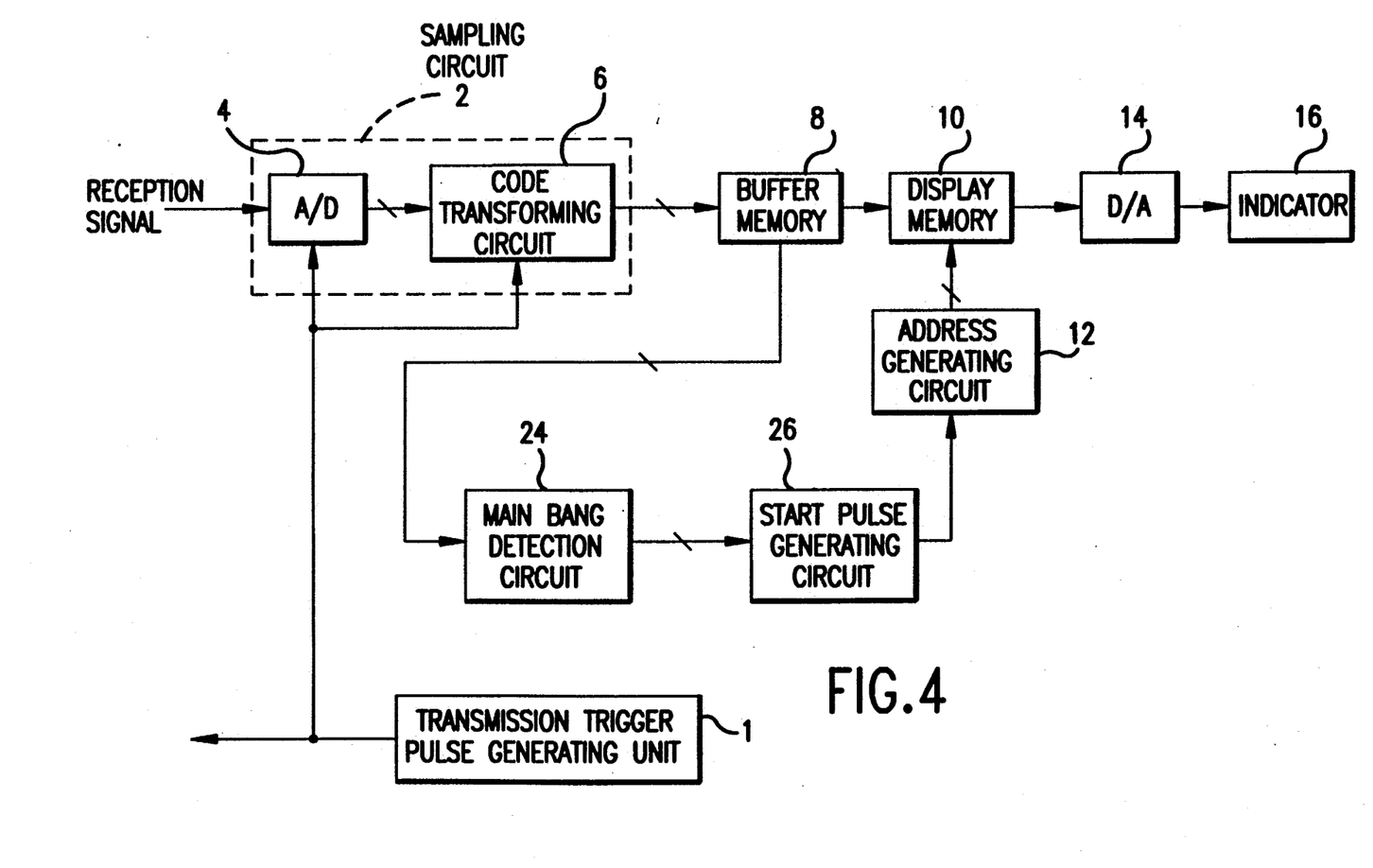
FIG. 4 is a block diagram of a principal portion of another embodiment according to the present invention.

With the second feature of the present invention, the transmission trigger pulse generating unit 1 is constructed in a manner that the output periods of transmission trigger pulses are different from one another for each trigger pulse. Also, a transmission trigger pulse from the transmission trigger pulse generating unit 1 is supplied to the sampling circuit 2 as a start pulse for initiating a sampling operation therein. The radar apparatus is also provided with the main bang circuit 24 for detecting a main bang included in the reception signal data by performing a sweep correlation on the reception signal data stored in the buffer memory 8 and corresponding to a plurality of beams, and a start pulse generating unit 26 for outputting a start pulse to the address signal generating unit 12 so that write address signals will be generated, in response to a main bang detected by the main bang detection circuit 24.

With the construction of the first feature of the present invention, a transmission trigger pulse is produced from the transmission trigger pulse generating unit 1, and at the same time reception signals are converted to digital signals in response to the transmission trigger pulse. The resultant converted signals are stored in the main bang detection memory 22. The main bang detection circuit 24 performs a sweep correlation on reception signals corresponding to a plurality of beams to detect a main bang included in the reception signal data. Here, since the output period of the transmission trigger pulses outputted from the transmission trigger generating unit 1 is set to be different from one another for each transmission trigger pulse, arrival time instants of so-called secondary echoes reflected by the same object and resulting from search pulses will be different from one another, and thus the secondary echoes will e eliminated. While, since the time duration from a time instant at which a transmission trigger pulse is emitted to another time instant at which a main bang is obtained is constant regardless of variations of the output period of the transmission trigger pulses, the main bang will be correlative. When a main bang is detected, the start pulse generating unit 26 applies a start pulse to the sampling circuit 2 to initiate a sampling operation therein so that the sampling circuit 2 starts to sample reception signal data and supplies the sampled data to the buffer memory 8.

While, with the construction of the second feature of the present invention, as a transmission trigger pulse is produced from the transmission trigger pulse generating unit 1, reception signals are sampled at a sampling circuit 2 in response to the transmission trigger pulse and the resultant sampled signals are stored in the buffer memory 8. A main bang is an echo signal having a high level included in reception signals appearing just after the transmission trigger pulse is produced. Thus, the main bang can be clearly distinguished from other signals having high levels. Accordingly, the main bang detection circuit 24 performs a sweep correlation on reception signals corresponding to a plurality of beams to detect a main bang included in the reception signal data. When, a main bang is detected, the start pulse generating unit 26 produces a start pulse to generate write address signals supplied to the address generating circuit 12 in response to the main bang so that the reception signal data stored in the buffer memory 8 will be written into the display memory 10 from that time instant on.

As explained in the foregoing, with either of the features of the present invention, a main bang is detected and reception signal data from the antenna are written into the display memory 10 with respect to the main bang so that images can always be displayed based on reception signal data obtained after a time instant corresponding to zero in distance from the antenna. As a result, image distortions in a distance direction are not produced so that erroneous aknowledgement of a distance based on radar information can be avoided.

According to a third feature of the present invention, a radar apparatus is comprised of transmitting and receiving means for radiating a radio pulse in synchronism with a trigger signal and receiving echo signals from objects, a primary memory for storing reception data corresponding to one sweep, a secondary memory for storing reception signal data corresponding to one scan, reception signal data transferring means for writing the contents of the primary memory into memory elements having addresses corresponding to a pointing direction of the antenna, timing shift amount setting means for setting a timing shift amount in a distance direction and read reference point varying means for varying a read reference point corresponding to the antenna position in the primary memory by the timing shift amount having been set.

With the radar apparatus according to the third feature of the present invention, a radio pulse is emitted by the transmitting and receiving unit in synchronism with a trigger signal generation and echo signals from objects are received, reception signal data corresponding to one sweep are stored in the primary memory, and the contents of the primary memory are written into memory elements of the secondary memory having addresses corresponding to the pointing direction of the antenna. A timing shift amount in a distance direction is set by the timing shift amount setting means, and the read reference position corresponding to the antenna position in the primary memory is moved by the timing shift amount that has been set.

Figure 10:
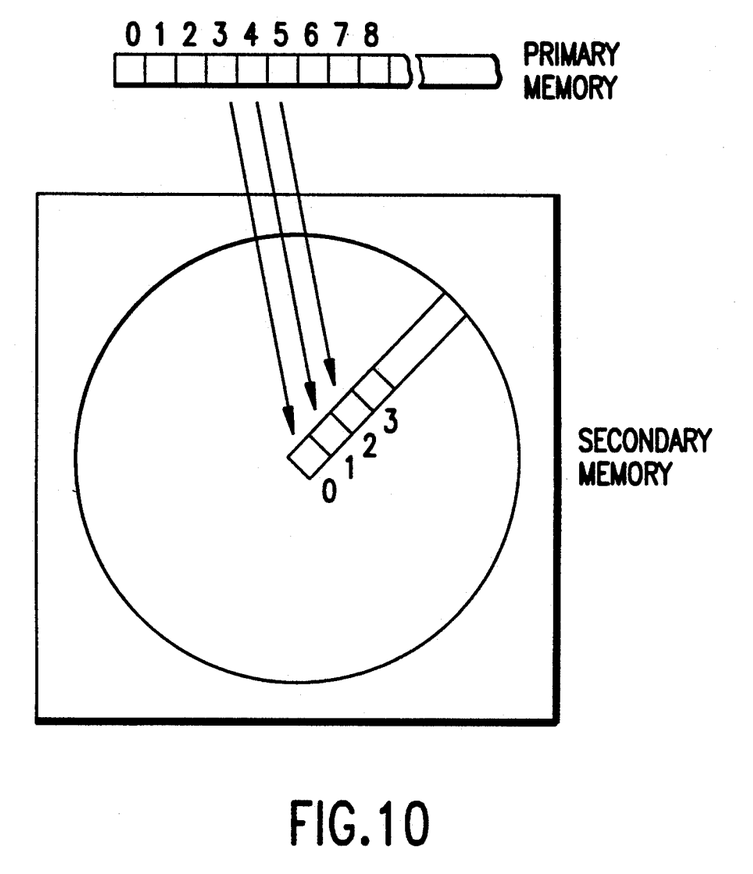
FIG. 10 shows a diagram for explaining the operation of the present invention.

The operation of the timing adjustment done as above is shown in FIG. 10. Referring to FIG. 10, reception signal data corresponding to one sweep are stored successively from the left in the primary memory. When the contents of the primary memory are transferred to the secondary memory, a position moved by a timing shift amount set by the reference point varying means will be the reference point in transferring the contents of the primary memory to the secondary memory. With the example shown in the figure, the third picture element in the primary memory corresponds to the center of the secondary memory as the read reference position corresponding to the antenna position.

In this way, the operation to transfer reception signal data temporarily stored in the primary memory to the secondary memory is made by the time that data corresponding to the next one sweep are written into the primary memory. Speed for transferring signals from the primary memory to the secondary memory is very slow as compared to the sampling period to sample reception signal data into the primary memory. Thus, digital circuits can be used without requiring high-speed operation, which can be constructed at a low cost.

DISCLOSURE OF THE PREFERRED EMBODIMENTS

Embodiment 1

Referring to FIG. 1, a transmission trigger pulse generating unit 1 generates a transmission trigger pulse which determines the radiation time instant at which a search electromagnetic signal is radiated from an antenna (not shown). The transmission trigger pulse generating unit 1 is constructed in a manner that the output periods of transmission trigger pulses are different from one another for each transmission trigger pulse, i.e., transmission trigger pulses jittered A sampling circuit 2 transforms echo signals resulting from a search radio signal to digital signals with a predetermined sampling period. The sampling circuit 2 may be comprised of, for example, an A/D converter 4 and a code transforming circuit 6. The code transforming circuit 6 performs data compression to transform a reception signal data having eight bits, for example, to a signal having three bits so that the memory capacity of a display memory 10 for storing data can be reduced. A buffer memory 8 temporarily stores reception signals received by a plurality of beams (for example, three beams) and sampled by the sampling circuit 2. The buffer memory 8 is provided to adjust the writing speed for writing reception signals into a display memory 10. The buffer memory 8 is controlled so that by the time fresh reception signals corresponding to one beam are written thereinto, reception signals corresponding to one beam and having been stored therein are transferred to the display memory 10. The display memory 10 stores the reception signal data transferred from the buffer memory 8 as display data and has memory elements with a number of the memory elements larger than that of the picture elements of an indicator 16. An address generating circuit 12 generates write/read address signals for writing display data into and reading them from the display memory 10. A D/A converter 14 converts digital signals read out from the display memory 10 to analog signals. An indicator 16 indicates image signals passed from the D/A converter 14 and is comprised of a cathode-ray tube.

An A/D converter 20 converts in response to a transmission trigger pulse supplied from the transmission trigger pulse generating unit 1 echo signals caught by the antenna to digital signals at a predetermined sampling period. A main bang detection memory 22 stores the digitized reception signals converted by the A/D converter 20, with the reception signals corresponding to a plurality of beams (for example, three beams). The main bang detection memory 22 replaces the oldest single beam signals stored therein with fresh single beam reception signals, each time one beam fresh reception signals are newly written thereinto. A main bang detection circuit 24 detects a main bang included in reception signal data by performing a sweep correlation on the echo signals corresponding to a plurality of beams which are stored in the main bang detection memory 22. A start pulse generating unit 26 produces a start pulse for initiating a sampling operation by the sampling circuit 2 in response to a main bang detected by the main bang detection circuit 24.

Figure 2:
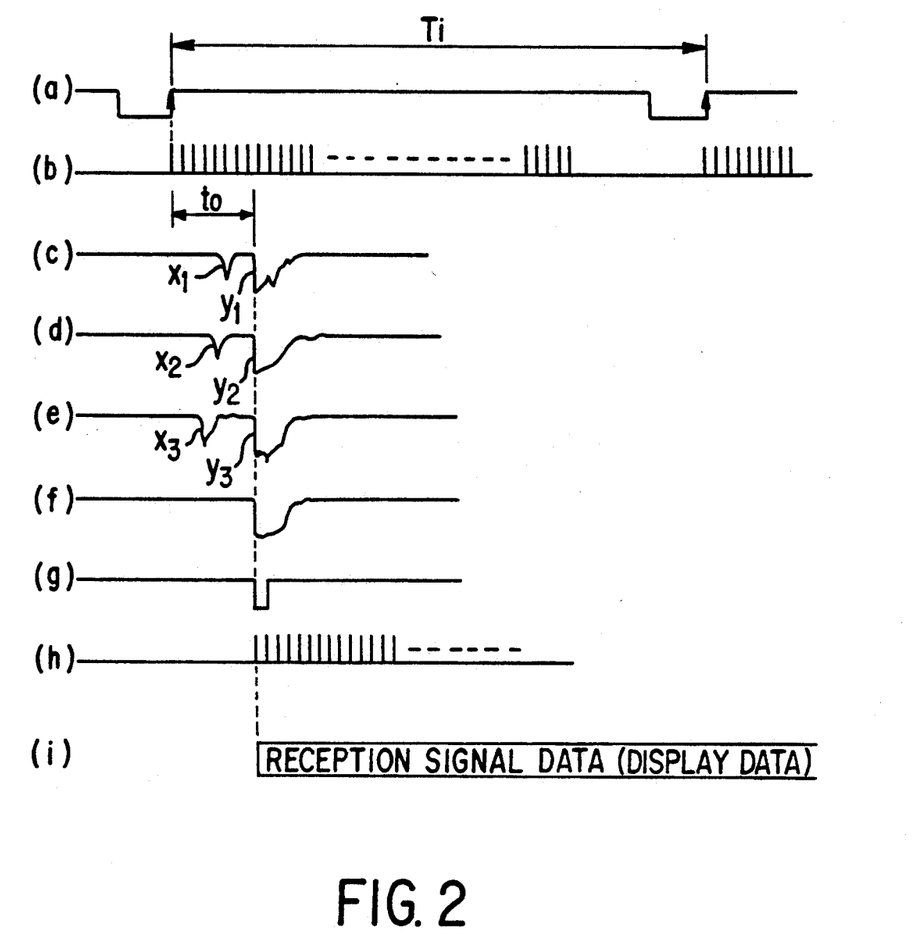
FIG. 2 and FIG. 3 show timing charts for explaining the operation of an embodiment shown in FIG. 1.

Next, the operation of the radar apparatus constructed as in the foregoing wi be explained by referring to a timing chart shown in FIG. 2.

The antenna rotates at a predetermined speed to search conditions surrounding the antenna. During each rotation of the antenna, there are repeatedly outputted from the transmission trigger pulse generating unit 1 transmission trigger pulses for determining time instants at which search pulse signals are emitted, as shown in waveform(a) of FIG. 2. In this case, the output recurrence period "Ti" of the transmission trigger pulses are different from one transmission trigger pulse to another. This transmission trigger pulse is supplied to the A/D converter 20 as a start pulse for starting an A/D conversion operation at the converter 20. The A/D converter 20 converts, in response to the start pulse, reception signals to digital signals for a predetermined period of time (refer to waveform(b) of FIG. 2). These digital signals are stored in the main bang detection memory 22.

After reception signals corresponding to a plurality of beams (for example, three beams) are stored in the main bang detection memory 22 (refer to the waveforms (c) through (e) of FIG. 2, the main bang detection circuit 24 performs a sweep correlation on the reception signal data corresponding to a plurality of beams so that a main bang included in the reception signal data is detected. In other words, since the output recurrence period of the transmission trigger pulses outputted by the transmission trigger pulse generating unit 1 is set in a manner that the period is different from one another for each transmission trigger pulse, so-called secondary echoes (which are represented with characters "x1" through "x3" in the figure) resulting from search radio signals and reflected by the same objects arrive at different positions in a time axis. As a result, the secondary echoes will be eliminated. While, a time $t_0$ between a time instant at which a transmission trigger pulse is outputted and another time instant at which main bangs (edges represented with characters "y1" through "y3" in the figure) are obtained is constant even if the output period "Ti" is varied for each transmission trigger pulse. Thus, the respective main bangs "y1" through "y3" appear at the same time positions with respect to the transmission trigger pulses. Accordingly, by performing a sweep correlation on reception signals, a main bang included in the reception signal data (refer to waveform (f) of FIG. 2) can be detected. It is to be noted that an edge appearing first after a transmission trigger pulse produced as shown in waveform(a) of FIG. 2 is taken as the main bang.

Figure 3:
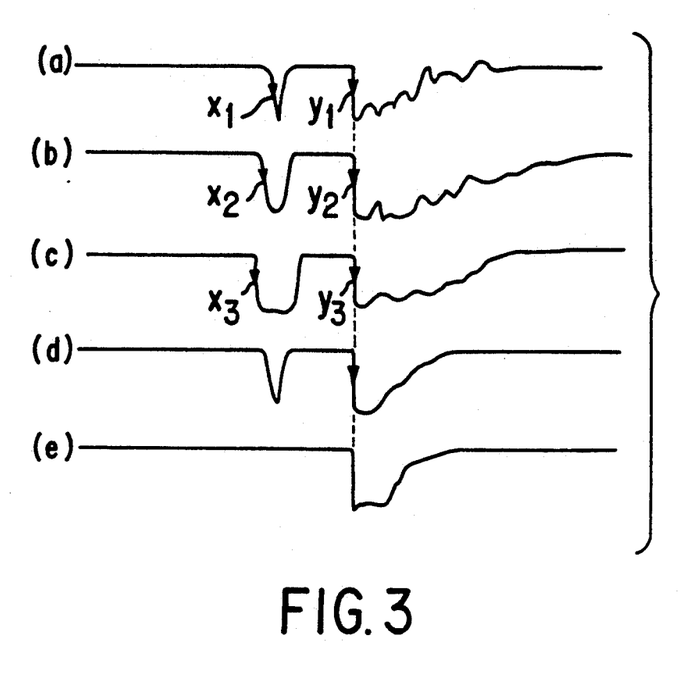

When a main bang is detected as in the foregoing, the start pulse generating unit 26 outputs, in response thereto, a start pulse for initiating a sampling operation in the sampling circuit 2 (refer to waveform(g) of FIG. 2). The A/D converter 4 starts, in response to the start pulse, an A/D conversion on reception signals (refer to waveform(h) of FIG. 2). Thus, the time instant for initiating the A/D conversion will be a point corresponding to zero in detection distance with respect to the antenna. A/D converted reception signal data (refer to waveform(i) of FIG. 2) are codified by the code converting circuit 6, and the resultant signals are stored in the buffer memory 8. The reception signal data corresponding to one beam and stored in the buffer memory 8 are transferred to the display memory 10 as image data by the time fresh echo signals are newly inputted thereinto. The image data stored in the display memory 10 are read out in synchronism with TV scans, converted to analog signals by the D/A converter 14 and supplied to the indicator 16 so that the signals are displayed thereon It is to be noted that a sweep false image may be included in reception signals. The sweep false image is a phenomenon that echo signals resulting from an emitted search pulse appear not in the present sampling period but in the next sampling period. The sweep false image is a kind of false image and may cause incorrect detection of a main bang. Some considerations will be made to this hereinafter. When reception signal data corresponding to a plurality of beams (refer to waveform (a) through (c) of FIG. 3) and including second sweep false images "x1" through "x3" having a time duration of some amount are merely ANDed by the main bang detection circuit 24 to perform a sweep correlation thereon, the second sweep false images cannot be fully eliminated as shown in waveform(d) of FIG. 3. In order to solve the drawback, it is preferable to detect an edge of the reception signal data (a rising edge in this example). In this case, since the edge of the second sweep false image appears at a different position, the second sweep false image can be eliminated with more precision as shown in waveform(e) of FIG. 3.

Embodiment 2

FIG. 4 shows a block diagram of another embodiment of a radar apparatus according to the present invention. Units having like numerals as with the embodiment 1 perform the same functions respectively.

With this embodiment, the transmission trigger pulse generating unit 1 is constructed in a manner that the output period of transmission trigger pulses is different from one another for each transmission trigger pulse. The transmission trigger pulse is supplied to the sampling circuit 2 as a start pulse for initiating to sample input signals. The main bang detection circuit 24 is constructed in a manner that a sweep correlation is performed on reception signal data corresponding to a plurality of beams and stored in the buffer memory 8. Further, the start pulse generating unit 26 produces, in response to a main bang detected by the main bang detection circuit 24, a start pulse which is supplied to an address generating circuit 12 for generating address signals. The other part of the construction is the same as that of the embodiment 1.

With such a construction, the A/D converter 20 and the main bang detection memory 22 can be deleted, and thus the circuit arrangement can be simplified, as compared to the embodiment 1.

Next, the operation of the radar apparatus shown in FIG. 4 will be explained by referring to a timing chart shown in FIG. 5.

Figure 5:
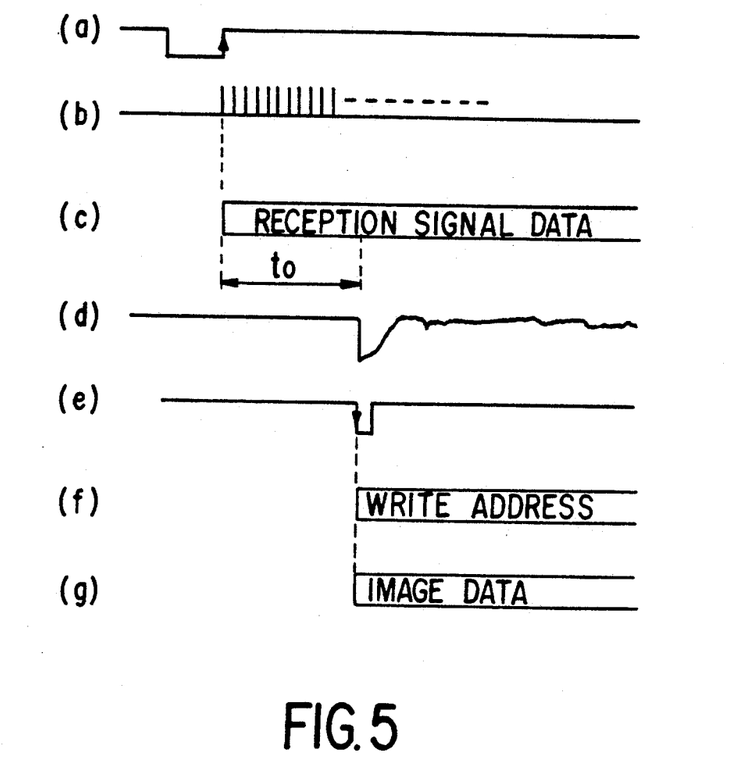
FIG. 5 shows timing charts for explaining the operation of the embodiment shown in FIG. 4.

With this embodiment, when a transmission trigger pulse is produced from the transmission trigger pulse generating unit 1 (refer to waveform(a) of FIG. 5), the transmission trigger pulse is supplied to the A/D converter 4 of the sampling circuit 2 as a start pulse for starting the A/D conversion. The A/D converter 4 converts, in response to the signal, reception signals to digital signals for a predetermined time period (refer to waveform(b) of FIG. 5). Thus, an operation to sample reception signal data is started at a time instant at which a transmission trigger pulse is produced (refer to waveform(c) of FIG. 5).

The reception signal data sampled by the sampling circuit 2 are stored in the buffer memory 8. Reception signal data corresponding to a plurality of beams (for example, three beams) and stored in the buffer memory 8 are transferred to the main bang detection circuit 24. The main bang detection circuit 24 performs a sweep correlation on reception signal data corresponding to a plurality of beams to detect a main bang included in the reception signal data (refer to waveform(d) of FIG. 5). When a main bang is detected, the start pulse generating unit 26 produces, in response thereto, a start pulse supplied to the address generating circuit 12 for producing address signals (refer to waveform(e) of FIG. 5).

While reception signals corresponding to one beam are read out from the buffer memory 8 and are transferred to the display memory 10 by the time fresh reception signal data corresponding to the next one beam are newly stored therin. During an initial period "t₀" in the longer period for reading out reception signals, write address signals are not generated by the address generating circuit 12 (refer to waveform(f) of FIG. 5). There are rejected data read out from the buffer memory 8 during a time period t₀ between a time instant at which a transmission trigger pulse is produced and another time instant at which a main bang is detected. Only the reception signals appearing after a time instant corresponding to zero in distance with respect to the antenna are stored in the display memory 10 as image data (refer to waveform(g) of FIG. 5).

In this way, with the embodiment 1 or the embodiment 2, a main bang is detected, and reception signals caught by the antenna and appearing afterwards in time with respect to the main bang are stored in the display memory 10. There will be always displayed the reception signal data appearing after a point corresponding to zero in distance from the antenna.

With each of the foregoing embodiments, when the main bang cannot be detected, a transmission failure has occured in the magnetron, and thus, reception signal data are not sampled. Conventionally, even if a transmission fails and transmission is not made, an operation for sampling data is performed. When a transmission fails, there are no echo signals from objects since no transmission wave energies are radiated from the antenna. Thus, although the radar apparatus starts to sample reception signals, images do not appear on the screen of a CRT since there are no signals existent. In other words, data "0" will be written into the display memory so that data stored in the display memory will be erased thereby. As a result, when an antenna points in an angular direction and a transmission is failured, data "0" will be linearly written into memory elements corresponding to the direction in the display memory. As a result, when objects are brilliantly displayed on CRT, a dark straight line will be drawn on the objects. The present invention is capable of effectively preventing such a drawback from occuring and improving the quality of the picture.

Embodiment 3

Figure 7:
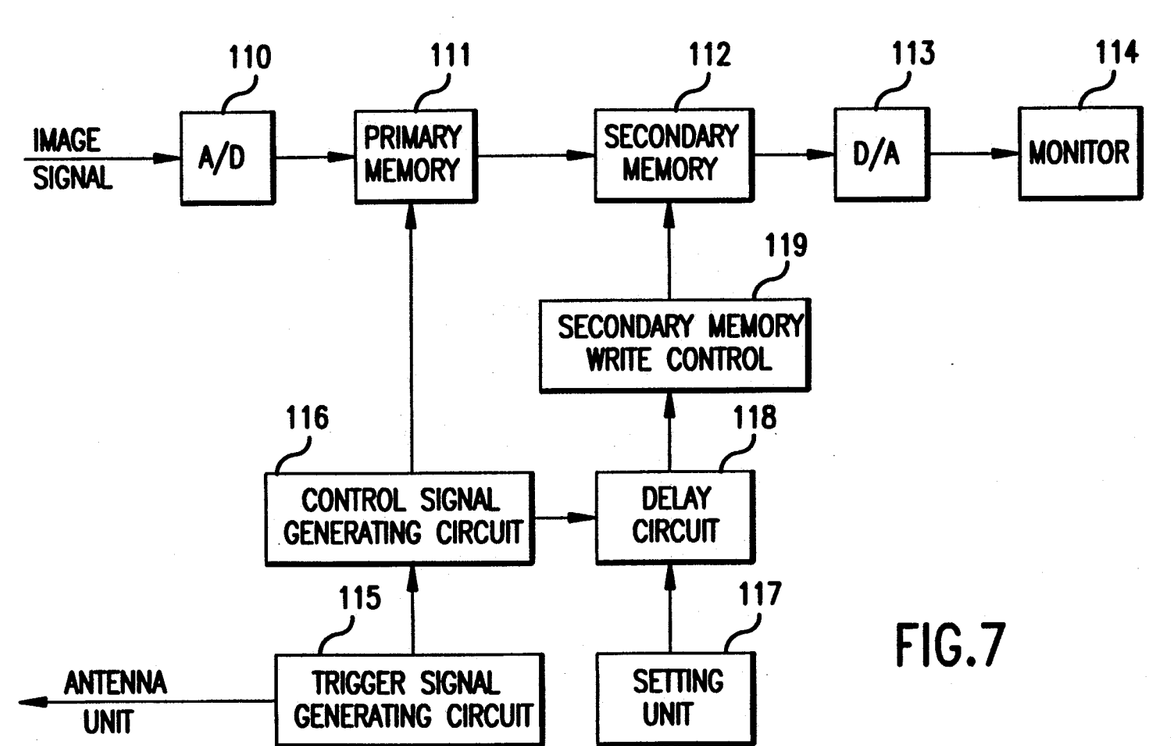
FIG. 7 is a bock diagram of a principal portion of another embodiment of a radar apparatus according to the present invention.

Referring to FIG. 7, a primary memory 111 is a high-speed memory comprising a SRAM and the like for storing reception signal data corresponding to one sweep. A memory 112 refreshes and stores reception signal data corresponding to one scan, i.e., one rotation of the antenna. An A/D converter 110 samples image signals inputted from an antenna unit at a constant period to convert the signals to digital signals and writes the resultant digital signals into a primary memory. A trigger signal generating circuit 115 supplies a trigger signal to the antenna unit and a control signal generating circuit 116 at a low frequency. The antenna unit emits a radio pulse in synchronism with a trigger generation and receives echo signals from objects. The control signal generating circuit 116 controls the primary memory 111 so that the memory starts to write reception signal data therinto in synchronism with a trigger signal generation. Also, the control signal generating circuit 116 supplies to a delay circuit 118 a signal representing a data transfer time period for transferring signals from the primary memory 111 to the secondary memory 112. The delay circuit 118 supplies to a secondary memory write control circuit 119 a write start timing signal a predetermined time after a signal representing a data transfer period is given by the control signal generating circuit 116. The delay circuit 118 comprises a counter for counting clock signals for transferring data from the primary memory 111 to the secondary memory 112 and a circuit for generating a data write start timing signal when the count value of the counter reaches a value set. A setting unit 117 sets the value and comprises, for example, a key-board. The secondary memory write control circuit 119 writes output data from the primary memory 111 into a predetermined area of the secondary memory 112 in synchronism with a data write start timing signal received from the delay circuit 118. Results of coordinates conversions from a polar coordinates to Cartesian coordinates depending on a pointing direction of the antenna performed at a CPU (not shown) are received therefrom and are further made correspondent to addresses of the secondary memory 112 to obtain write addresses of the secondary memory 112. A D/A converting circuit 113 reads out display data from the secondary memory 112 in synchronism with raster scans and converts the data to analog signals and outputs the data to a monitor as display signals. The monitor 114 displays in day-light a two-dimensional radar image based on image signals supplied.

Figure 8:
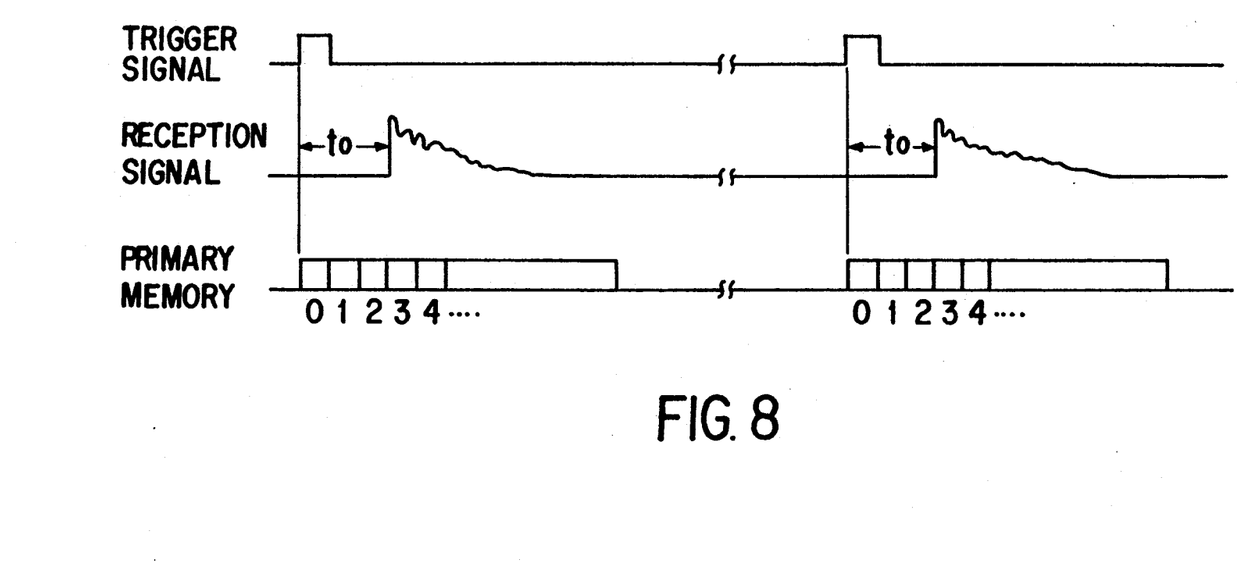
FIG. 8 is a timing chart representing signals relating to the embodiment shown in FIG. 7.
Figure 9:
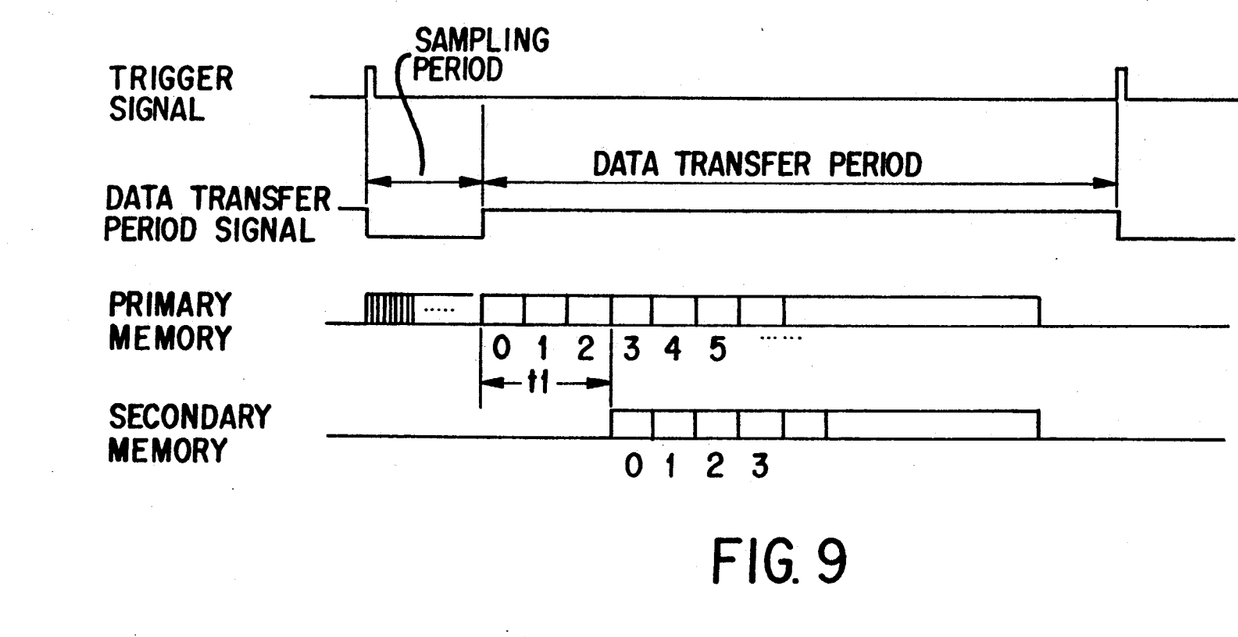
FIG. 9 is a timing chart representing signals relating to the embodiment shown in FIG. 7.

Timing charts at principal portions in the radar apparatus are shown in FIG. 8 and FIG. 9. Referring to FIG. 8, reception signals appear a time $t_0$ after a trigger signal is produced, and the primary memory starts to write data thereinto at a time instant at which a trigger signal rises. Thus, unnecessary data such as no signals are written into a first portion of the primary memory.

With the example shown in the figure, data are written into memory elements including and following the third memory elements of the primary memory.

It is to be noted that each memory element of the primary memory is illustrated extremely coarse in order to make the drawing clear.

Also, as shown in FIG. 9, reception signals are sampled during a sampling period after a trigger signal is generated, and reception data are written into the primary memory. Then, during a data transfer period, the content of the primary memory is transferred to the secondary memory at a low speed. The content of the primary memory outputted after a delay time "t1" determined by the delay circuit 118 elapses are transferred to the secondary memory. As a result, a first part of the primary memory corresponding to the delay time are not written into the secondary memory. With the example shown in FIG. 9, reception data in memory elements including and following the third memory element are successively written into the secondary memory from the center thereof to an outward direction.

It is to he noted that the foregoing embodiments are merely some embodiments according to the present invention. It is apparent that a person skilled in the art can easily present other embodiments and variations without departing from the spirit and scope thereof.

According to the present invention, by detecting a main bang, a timing adjustment is automatically made so that reception signals are displayed starting at a point corresponding to zero distance from the antenna. Accordingly, the timing adjustment done conventionally becomes unnecessary, even when a radar apparatus is newly installed on a ship or the like, or when cables or circuit components in transmitting and receiving unit are changed. As a result, such advantageous effects are produced that cumbersome timing adjustment operations are not required any more.

According to the present invention, a timing adjustment is made in a manner that the read reference point corresponding to the antenna position in the primary memory is moved in transferring the content of the primary memory to the secondary memory. Hence, even a long time delay compensation can be made with a precise timing compensation without any jitters by using digital circuits operated at a comparatively slow speed. Since circuits operable at a high speed are not required, the radar apparatus can be constructed at a low cost.

We claim:

1. A radar apparatus for radiating search signals successively in different directions, receiving echo signals and displaying the signals so that surrounding conditions in a wide range of directions are displayed, comprising:

an input for receiving echo signals;

a first memory for storing received echo signal data corresponding to one sweep and supplied from said input;

a second memory for storing received signal data corresponding to one scan and supplied from said first memory;

a indicator for displaying the signals read out from said second memory;

main bang detection means for detecting a main bang included in the received echo signals; and start signal generating means for generating a start pulse for initiating to write echo signals into said first memory based on the main bang detected by said main bang detection means.

2. A radar apparatus fur radiating search signals successively in different directions, receiving echo signals and displaying the signals so that surrounding conditions in a wide range of directions are displayed, comprising:

an input for receiving echo signals;

a buffer memory for storing echo signals resulting from one search signal;

a memory for storing at corresponding memory elements echo signals corresponding to one scan and supplied from said buffer memory;

main bang detection means for detecting a main bang included in the echo signals supplied from said buffer memory; and start signal generating means for generating a start pulse for initiating writing of echo signals from said buffer memory into said memory based on the main bang detected by said main bang detection means.

3. A radar apparatus in which a transmitting pulse is transmitted in response to a trigger signal, comprising:

a source of said trigger signal and an input for receiving echo signals from objects;

a primary memory for storing received signal data from said input and corresponding to one sweep;

a secondary memory for storing received signal data corresponding to one scan;

reception data transfer means comprising means for sequentially reading signals stored in said primary memory, starting from a predetermined location in said primary memory, and writing the read signals into memory elements of said secondary memory corresponding to a pointing direction of an antenna;

timing amount determining means for determining a time delay corresponding to a distance in a direction from said apparatus; and read reference point varying means for shifting the predetermined location corresponding to an antenna position in said primary memory by an amount corresponding to said time delay.

4. A radar apparatus claimed in claim 3 wherein the means for shifting comprises a counter and signal generating means for generating a start signal in response to the output signal of said counter.

5. A radar apparatus comprising:
- transmission trigger pulse generating means for generating a trigger pulse for determining the transmission timing of search signals from an antenna;
- a sampling circuit for sampling at a predetermined sampling period received signals resulting from the search signal, reflected by objects and caught by the antenna;
- a buffer memory for storing the reception signals sampled by said sampling circuit and corresponding to a plurality of beams;
- a display memory for storing as image data the received signal data transferred from said buffer memory;
- an address signal generating circuit for generating write/read address signals for the image data written into and read from said display memory;
- an indicator for displaying the image data read out from said display memory;
- an A/D converter for converting the reception signals obtained by the antenna to digital signals at a predetermined sampling period in response to a transmission trigger pulse from said transmission trigger pulse generating unit;
- a main bang detection memory for storing the reception signals corresponding to a plurality of beams and digitized by said A/D converter;
- a main bang detection circuit for detecting a main bang included in the reception signal data by performing a sweep correlation on the reception signal data corresponding to a plurality of beams and stored in said main bang detection memory and;
- start pulse generating means for producing a start pulse for initiating a sampling operation in said sampling circuit in response to a main bang detected by said main bang detection circuit.

6. A radar apparatus comprising:
- transmission trigger pulse generating means for generating a trigger pulse for determining the transmission timing of search signals from an antenna;
- a sampling circuit for sampling at a predetermined sampling period reception signals resulting from the search signal, reflected by objects and caught by the antenna;
- a buffer memory for storing the reception signals sampled by said sampling circuit and corresponding to a plurality of beams;
- a display memory for storing as image data the reception signal data transferred from said buffer memory;
- an address signal generating circuit for generating write/read address signals for the image data written into and read from said display memory;
- an indicator for displaying the image data read out from said display memory;
- a main bang detection circuit for detecting a main bang included in the reception signal data by performing a sweep correlation on the reception signal data stored in said buffer memory and corresponding to a plurality of beams; and
- start pulse generating means for producing a start pulse for causing said address signal generating circuit to produce write address signals in response to a main bang detected by said main bang detection circuit.

* * * * *